Dec. 29, 1931.  E. JENKINS  1,838,226
HEADLIGHT ADJUSTING DEVICE
Filed Nov. 7, 1930
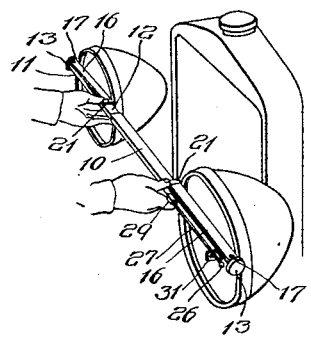
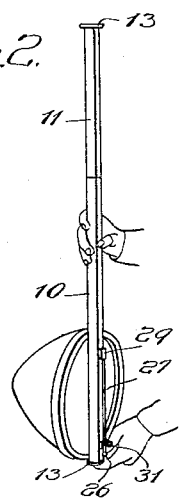
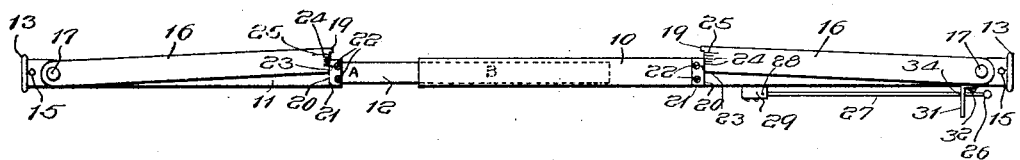
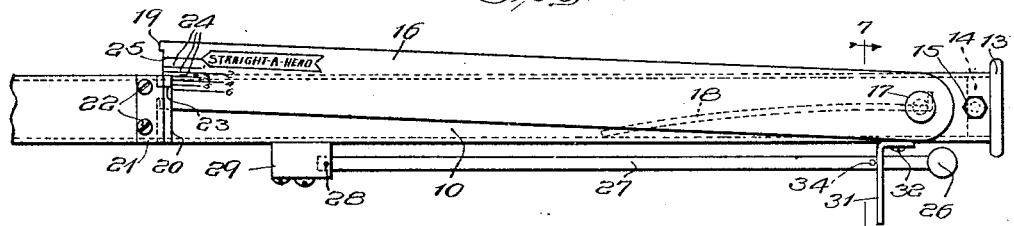
Witness:
William P. Kilroy
Inventor:
Emerson Jenkins Patented Dec. 29, 1931

1,838,226

UNITED STATES PATENT OFFICE

EMERSON JENKINS, OF DANVILLE, ILLINOIS

HEADLIGHT ADJUSTING DEVICE

Application filed November 7, 1930. Serial No. 494,002.

This invention relates to improvements in headlight adjusting devices.

The adjusting device of the present invention is designed as an improvement on the device which forms the subject matter of my copending patent application, Serial No. 316,828, filed November 2, 1928.

The object of the present invention is to provide a gauge device which is of sufficient length to span the distance between the companion headlights of an automobile for the purpose of establishing a base reference to determine the angular adjustment of the respective headlights. The device employs adjustable gauge members, which by contact, each, with both sides of the contiguous headlight, establish the frontal plane thereof and permit of adjustment to any desired angle.

In my previous application, it was necessary, after bringing the body of the device into contact with the two headlights, to manually adjust each of the gauge members, but this involved additional manipulation and inconvenience, which is avoided in the present case by making the gauge members self-adjustable to the respective headlights. Furthermore, the present device is made more compact and involves improvements in general construction, as well as in detail, the parts being so arranged that the device as a whole may be readily housed and carried in the same case.

Further objects and details of the invention appear from the description thereof in conjunction with the accompanying drawings, wherein Fig. 1 is a perspective view showing the manner of gauging the headlights to determine the horizontal angular adjustment;

Fig. 2 is a similar view showing the method of gauging the vertical angular adjustment;

Fig. 3 is a plan view of the device as a whole;

Fig. 4 is an enlarged detail showing one of the gauge members;

Fig. 5 is an enlarged detail, part in section, showing the stop for limiting the outward swinging movement of one of the gauge members;

Fig. 6 is a sectional elevation, taken on line 6—6 of Fig. 5; and

Fig. 7 is a cross-sectional view, taken on line 7—7 of Fig. 4.

The adjusting device, as a whole, comprises a body portion consisting of members 10 and 11, each of which, in the form shown, is of square metal tubing. The section 11 is provided with an extension 12, also square tubing, which fits snugly within the body section and extends outwardly therefrom and is telescoped into the section 10, so that the body becomes extensible to adapt the device for a gauging of headlights variably spaced on automobiles of different makes. Each of the sections of the body at the end is closed by a circular disc 13 provided with a square boss 14 which fits into the end of the associated body section within which it is held by means of a screw 15, thus closing the ends of the device against the admission of dirt or foreign matter to the interior.

Each of the body sections, near its outer end, has pivoted thereto a swinging gauge plate 16 which is sufficiently long to span across the rim of an automobile headlight and held in such a way as to bring its edge into contact with both sides of the rim, as indicated in Fig. 1, in order to determine the frontal plane of the headlight. The gauge plates are preferably composed of thin flat plates of metal, of a width equal to the width of the body section, so that when the plates are brought into parallelism with the body sections they will lie flush therewith, which is the position assumed by the plates when brought into gauging contact with a pair of automobile headlights which are adjusted for a direct forward parallel projection of the beams of light.

Each of the gauge members is fixedly mounted near its outer end on a pintle 17 which is journaled through the wall of the body, as indicated in Fig. 7. The pintle has entered therethrough the outer end of a flat spring 18 which lies within the body section and bears against one of the walls thereof, and which is tensioned to impart an outward swinging movement to the gauge plate to normally hold the edge thereof into angular relation with the plane of the body, as in Fig. 4. In order to limit the outward swinging movement of the gauge plate, the latter, at its inner end, is provided on each corner with a stop finger 19, which stop fingers swing beneath the rabbeted edge 20 of a plate 21 which is secured to the body by screws 22 in position to overhang the free end of the gauge plate.

As shown in Fig. 5, the undercutting of the plate 20 is interrupted to provide a stop lug 22 which projects into the path of movement of the stop fingers 19, so that the inward swinging movement of the gauge plate will be limited when its edge is brought into flush relation with the side of the body and its outward swinging movement will be limited when it has been swung outwardly to a degree indicating the maximum adjustment within the range of the instrument.

The plate 21 is preferably beveled down to a knife edge which closely overlies the exposed surface of the gauge plate, and the knife edge, at a suitable point, is provided with a notch 23 which co-acts with a plurality of graduation marks 24 formed on the end of a gauge plate, the outermost 25 of which is marked with the inscription "Straight ahead", or similar designation indicative of the fact that when the mark 25 is brought into register with the notch 23, the acting edge of the gauge plate will lie in flush or parallel relation with the side face of the body and indicate a position in which the headlight is adjusted to throw a beam straight ahead without lateral deflection.

The graduated marks 24 are suitably inscribed to indicate respectively the distance ahead at which converging beams from a pair of similarly adjusted headlights would intersect.

In order to measure the angular adjustment of the headlight with respect to the vertical, one end of the body of the device is provided with a plumb weight 26 carried by a stem 27 which is pivoted on a pintle 28 carried by a block 29 secured to the side of the body. The stem of the plumb weight is adapted to swing within a slot 30 in an outstanding plate 31 which is secured to the same side of the body by means of screws 32. The plate 31 is provided with graduated markings 33 that cooperate with either end of a pin 34 carried by the stem of the plumb weight.

As shown, the innermost markings of the graduated plate 31 are inscribed with a "0", which indicates that when the pin 34 stands in register with the "0" markings, the frontal plane of the headlight will stand at an exactly vertical plane.

The next marking shown is 75, which indicates that when the end of the pin registers with said marking a beam from the headlight will strike level ground at a distance of 75 feet in front of the light and the remaining markings similarly indicate the distances ahead to which the headlight may be adjusted to cause its beam to strike the ground.

In use, the springs acting upon the respective gauge plates will cause the free end of each of them to swing outwardly to the maximum position of divergence from the side plane of the body, the body being substantially adjusted to the desired degree to enable it to conveniently span the distance completely across both headlights of the car to bear against the rims thereof. If, by chance, one or both of the headlights should be maladjusted to such an extent as to prevent the instrument from contacting with the outermost edge of the rim, this will immediately indicate the fact that one or both of the headlights are so adjusted as to cause the beams to diverge rather than to converge, which latter is a condition which should always be maintained unless exact parallelism in the forward application of the beam is desired.

After the headlights are properly adjusted, if necessary, to permit the body to obtain contact with the outer turns of the rims of both headlights, a base of reference will be established which enables the angles of convergence, either actual or desired, to be secured. By merely pressing the body of the instrument into contact with the rims of the respective headlights, the respective gauge plates will, in each instance, by contact across the front of the contiguous headlight, establish the angle of convergence, which may be instantly read by observing the position of one of the graduated lines 24 with respect to the notch in the plate 21, so that the respective headlights may be adjusted until the readings indicate that the desired angle of convergence has been secured. By providing springs which normally serve to force the gauge plates outwardly, the latter will immediately assume positions to the desired readings, without individual manipulation, so that the desired adjustments of the respective headlights can be made very quickly and accurately.

Where adjustment of the headlight is desired with reference to a vertical plane, the reading will be obtained as in Fig. 2; but since, in this instance the body of the instrument stands vertically, and since the base of reference is established by the plumb rod rather than by contact with the headlights of the automobile, it is obvious that a single plumb rod member affords the means for gauging and adjusting each of the headlights in turn.

By forming the body of the device from square metallic tubing, not only can the sections of the body be readily arranged to telescope together, but space will be afforded on the interior for the spring mountings, and a square plane exterior surface will be provided to underlie each of the gauge plates to insure accurate swinging movements and a flat plane side surface will be afforded for contact of the body sections with the rims of the respective headlights. The device, as a whole, is rigid in construction and neat and compact in appearance and accurate in use.

I claim:

1. In a gauge device of the character described, the combination of a body portion adapted to maintain ascertained relationship to both headlights of a vehicle, a member carried by said body portion and adjustable with respect thereto, and adapted by contact to gauge the frontal plane of an adjacent headlight, means, in part on the body portion and in part on the said member, for indicating the angular relationship between the body portion and said member when the latter is in engaging contact with the headlight, and means normally acting to hold said member at a maximum angle to the body portion and adapted to permit said member to adjust itself under pressure to the frontal plane of the headlight being gauged.

2. In a gauge device of the character described, the combination of a body portion adapted to maintain ascertained relationship to both headlights of a vehicle, a member carried by said body portion and adjustable with respect thereto, and adapted by contact to gauge the frontal plane of an adjacent headlight, means, in part on the body portion and in part on the said member, for indicating the angular relationship between the body portion and said member when the latter is in engaging contact with the headlight, a spring normally acting to hold said member at a maximum angle to the body portion, and stop members for limiting the outward displacement of said gauging member, the latter being yieldable under pressure to maintain contact with the headlight.

3. A gauging device of the character described, comprising a body portion adapted to maintain ascertained relationship to both headlights of a vehicle, a gauge plate pivoted to said body portion and having its free end inscribed with graduations indicating angles of displacement from the plane of the body portion, a member on the body portion adapted to co-act with said graduations in obtaining a reading therefrom, and a member adapted to act upon said gauge plate to normally cause the same to diverge from the plane of the body portion and adapted to permit yielding of the gauge plate under pressure when in contact with an adjacent headlight to secure a reading indicative of the frontal plane of said headlight.

4. A gauging device of the character described, comprising a body portion consisting of two sections of polygonal tubing telescoped together to permit longitudinal extension of the body and presenting, when in use, a flat face upwardly and a flat face vertically in position to contact with the outer margins of both rims of a pair of automobile headlights, the body portion having a gauge plate pivoted to its upwardly presented face, the gauge plate, at its free end, having graduation marks, and the body portion, contiguous to the free end of the gauge plate, having a mark thereon adapted to register with said graduation marks to indicate the angular relation between the body and the gauge plate.

5. A gauging device of the character described, comprising a body portion consisting of two sections of polygonal tubing telescoped together to permit longitudinal extension of the body and presenting, when in use, a flat face upwardly and a flat face vertically in position to contact with the outer margins of both rims of a pair of automobile headlights, the body portion having a gauge plate pivoted to its upwardly presented face, the gauge plate, at its free end, having graduation marks, and the body portion, contiguous to the free end of the gauge plate, having a mark thereon adapted to register with said graduation marks to indicate the angular relation between the body and the gauge plate, and a spring member adapted to normally hold the gauge plate into maximum angular relation to the body and adapted to yield to permit the gauge plate to adjust itself to the frontal plane of a contiguous headlight.

6. A gauging device of the character described, comprising a body portion consisting of two sections of polygonal tubing telescoped together to permit longitudinal extension of the body and presenting, when in use, a flat face upwardly and a flat face vertically in position to contact with the outer margins of both rims of a pair of automobile headlights, the body portion having a gauge plate pivoted to its upwardly presented face, the gauge plate, at its free end, having graduation marks, and the body portion, contiguous to the free end of the gauge plate, having a mark thereon adapted to register with said graduation marks to indicate the angular relation between the body and the gauge plate, and a spring located within the tubular body portion and connected with the gauge plate and adapted normally to swing the free end of the gauge plate outwardly with respect to the body and adapted to yield under pressure to permit the gauge plate to adapt itself to the frontal plane of a contiguous headlight.

7. A gauging device of the character described, comprising a body portion consisting of two sections of polygonal tubing telescoped together to permit longitudinal extension of the body and presenting, when in use, a flat face upwardly and a flat face vertically in position to contact with the outer margins of both rims of a pair of automobile headlights, the body portion having a gauge plate pivoted to its upwardly presented face, the gauge plate, at its free end, having graduation marks, and the body portion, contiguous to the free end of the gauge plate, having a mark thereon adapted to register with said graduation marks to indicate the angular relation between the body and the gauge plate, a spring member adapted to normally hold the gauge plate into maximum angular relation to the body and adapted to yield to permit the gauge plate to adjust itself to the frontal plane of a contiguous headlight, a plumb rod pivoted to the tubular body portion on the flat side thereof opposite to the side adapted for contact with the headlights, and an outwardly extending plate secured to the body near the free end of the plumb rod and having thereon graduation marks indicating the angular displacement of the plumb rod with respect to the plane of the headlight contacting face of the body.

8. A gauging device of the character described, comprising a body portion consisting of two sections of polygonal tubing telescoped together to permit longitudinal extension of the body and presenting, when in use, a flat face upwardly and a flat face vertically in position to contact with the outer margins of both rims of a pair of automobile headlights, the body portion having a gauge plate pivoted to its upwardly presented face, the gauge plate, at its free end, having graduation marks, and the body portion, contiguous to the free end of the gauge plate, having a mark thereon adapted to register with said graduation marks to indicate the angular relation between the body and the gauge plate, a spring located within the tubular body portion and connected with the gauge plate and adapted normally to swing the free end of the gauge plate outwardly with respect to the body and adapted to yield under pressure to permit the gauge plate to adapt itself to the frontal plane of a contiguous headlight, a plumb rod pivoted to the tubular body portion on the flat side thereof opposite to the side adapted for contact with the headlights, and an outwardly extending plate secured to the body near the free end of the plumb rod and having thereon graduation marks indicating the angular displacement of the plumb rod with respect to the plane of the headlight contacting face of the body.

9. A gauging device of the character described, comprising a body consisting of two sections of square tubing telescoped together to permit longitudinal extension and adapted when in use to span the space across a pair of automobile headlights and contact the outer margins of the rims thereof, a pair of gauge plates pivoted one each to the upper flat side of the body and adapted to swing inwardly to each, to gauge the frontal plane of the contiguous headlight, each of the gauge plates being inscribed at its free end with graduation marks and co-acting marks on the body portion adapted, in conjunction with the graduation marks, to indicate the angularity of the gauge plates with respect to the plane of the headlight contacting face of the body, each of the gauge plates having a spring connected therewith and located within the tubular body and adapted to normally cause the associated gauge plate to swing inwardly to maintain contact with the contiguous headlight and adapted to permit yielding of the gauge plate to gauge the frontal plane of the headlight.

10. A gauging device of the character described, comprising a body consisting of two sections of square tubing telescoped together to permit longitudinal extension and adapted when in use to span the space across a pair of automobile headlights and contact the outer margins of the rims thereof, a pair of gauge plates pivoted one each to the upper flat side of the body and adapted to swing inwardly to each, to gauge the frontal plane of the contiguous headlight, each of the gauge plates being inscribed at its free end with graduation marks and co-acting marks on the body portion adapted, in conjunction with the graduation marks, to indicate the angularity of the gauge plates with respect to the plane of the headlight contacting face of the body, each of the gauge plates having a spring connected therewith and located within the tubular body and adapted to normally cause the associated gauge plate to swing inwardly to maintain contact with the contiguous headlight and adapted to permit yielding of the gauge plate to gauge the frontal plane of the headlight, a plumb rod pivoted to the flat side of the body opposite to the headlight contacting side thereof, and an outwardly extending plate secured to said side of the body near the free end of the plumb rod and inscribed with graduation marks indicating the angular relation between the plumb rod and the headlight contacting face of the body.

In witness that I claim the foregoing I have hereunto subscribed my name this 3rd day of November, 1930.

EMERSON JENKINS.